March 3, 1931.    J. VAN HOORN    1,795,061
SLICING MACHINE
Filed April 13, 1928

Patented Mar. 3, 1931

1,795,061

UNITED STATES PATENT OFFICE

JETZE VAN HOORN, OF VOORBURG, NETHERLANDS, ASSIGNOR TO U. S. SLICING MACHINE COMPANY, OF LA PORTE, INDIANA, A CORPORATION OF INDIANA

SLICING MACHINE

Application filed April 13, 1928, Serial No. 269,621, and in the Netherlands April 27, 1927.

This invention relates to slicing machines having a power driven rotary knife and is concerned more particularly in the provision of an efficient driving mechanism that will give maximum economy in space and will be properly lubricated at all times without danger of throwing the lubricant on the food.

Further advantages will appear as the description proceeds.

Figure 1:
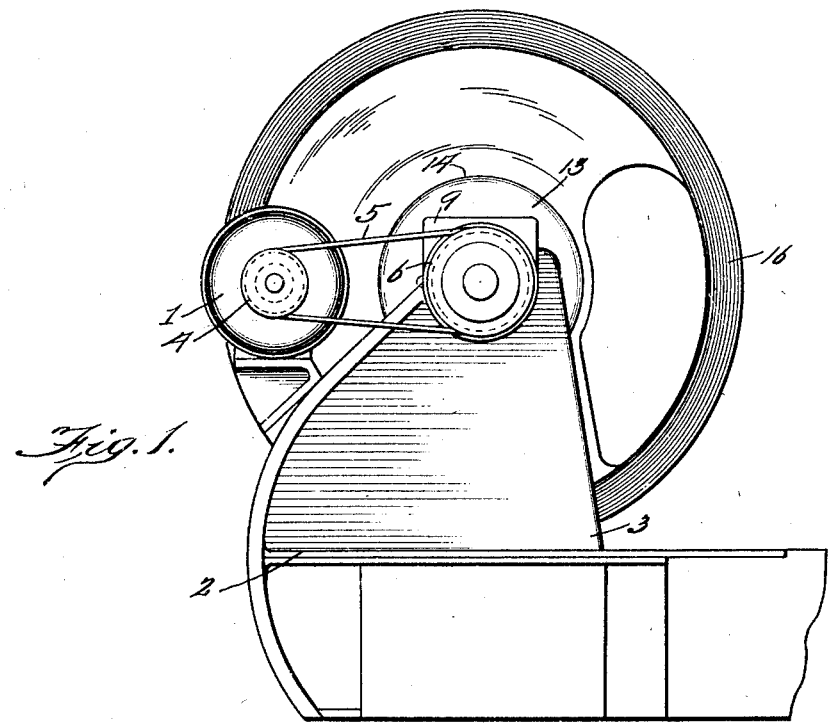
Fig. 1 is an elevation of a slicing machine embodying my invention.
Figure 2:
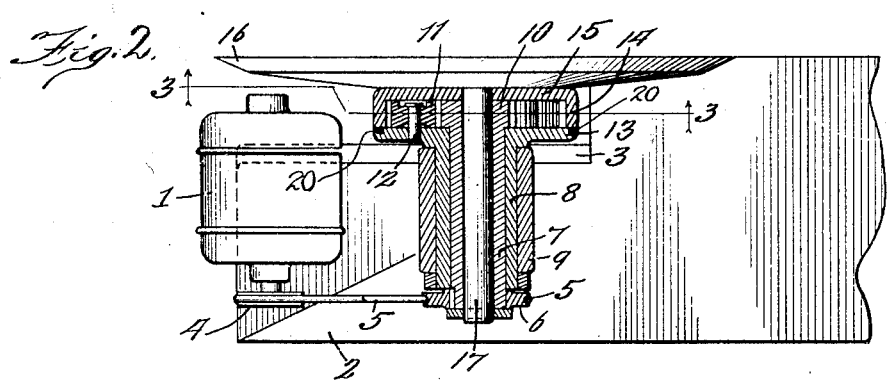
Fig. 2 is a plan view showing the driving mechanism for the knife in section.
Figure 3:
Fig. 3 is a section taken on line 3—3 of Fig. 2.

The bracket 3 rising from the base 2 of the machine is formed at its upper end with a cylindrical clamping portion 9 which rigidly holds a cylindrical bearing 8. The bearing 8 has a flange 13 carrying trunnions 12 upon which pinions 11 are journaled. A hollow cylindrical driving element 7, carrying a pulley 6 at one end and a gear 10 at the other end, is journaled in the bearing 8. Within the cylindrical member 7 is journalled the trunnion or stub shaft 17 rigid with the knife 16. A driven element constituting a housing part 15, rigid with the knife 16 or shaft 17, or with both the shaft and knife, is formed with a peripheral flange 14 co-operating with the flange 13 to form a complete enclosure for the gearing constituted by the pinions 10 and 11 and an internal gear formed on the inner surface of the flange 14. The sprocket or pulley 6 is connected by a chain or belt to a pulley or sprocket 4 carried by the drive shaft of a motor 1. As shown in Fig. 3 the teeth on the pinion 7 mesh with the pinions 11 which in turn mesh with the teeth on the flange 14. Rotation of the hollow shaft 7 by the motor 1 therefore rotates the housing part 15 through the gears 11, causing rotation of the knife 16 and its trunnion 17 journaled within the hollow shaft 7. A packing ring, 20, may be placed between the stationary part 13 and rotatable part 15 of the housing in order to make a better grease tight joint.

It will be seen that I have provided a driving mechanism that will run efficiently and smoothly through proper lubrication and that the novel arrangement of the gearing in the housing will prevent any lubricant from being thrown on the food. This arrangement also results in economy of space since it permits the replacement of the usual large pulley and guard with a much smaller pulley thereby increasing the space above the reciprocating meat table.

I claim:—

1. In a slicing machine having a slicing knife, a supporting bracket, a power unit to rotate said knife, a driven element attached to one side of said knife, a driving element mounted in said bracket and having its ends extending at each side thereof, a power connection between the end of said driving element remote from said knife and said power unit, and reduction gearing between the other end of said driving element and said driven element.

2. In a slicing machine having a slicing knife, a supporting bracket, a power unit to rotate said knife, a driven element attached to one side of said knife, a driving element mounted in said bracket and having its ends extending at each side thereof, a power connection between the end of said driving element remote from said knife and said power unit, reduction gearing between the other end of said driving element and said driven element, and an oil retaining housing surrounding said reduction gearing.

3. In a slicing machine having a rotatably mounted slicing knife, a flanged housing rigid with said knife, a ring gear formed on the flange of said housing, a tubular bearing having a flanged end co-operating with the flange on said housing to form a cover therefor, a shaft journaled in said bearing and having a gear thereon disposed in said housing, spur gears journaled on the flange of said bearing meshing with said first-named gear, and power receiving means on the end of said bearing remote from said housing.

4. In a slicing machine having a rotating slicing knife, a flanged member forming a housing attached to said knife, a ring gear formed on said flange, a supporting bracket, a bearing in the upper end of said bracket, said bearing having a flange co-operating with the flange on said housing to form a cover therefor, spur gears meshing with said ring gear, a hollow tubular shaft journaled in said bearing, one end of said shaft having a gear thereon meshing with said spur gear and the other end of said shaft extending beyond said bracke and provided with power receiving means.

5. In a slicing machine having a slicing knife, a flanged housing attached to said knife, a ring gear formed on the flange of said housing, a bearing having a flanged end co-operating with said housing to form a cover therefor, spur gears journaled on the flange of said bearing and meshing with said ring gear, a hollow tubular shaft journaled in said bearing, said shaft having power receiving means thereon at one end and a spur gear on the other end disposed in said housing and meshing with said first-mentioned spur gears, and a stub shaft extending from the knife and journaled in said hollow shaft.

6. In a slicing machine having a slicing knife, a flanged housing attached to said knife, a ring gear formed on the flange of said housing, a supporting bracket, a bearing carried by said bracket and having a flanged end disposed at one side of said bracket and co-operating with said housing to form a cover therefor, spur gears journaled on the flange of said bearing and meshing with said ring gear, a hollow tubular shaft journaled in said bearing, said shaft having power receiving means thereon, said power receiving means being disposed on the side of said bracket remote from said housing, a spur gear on the other end of said shaft meshing with said first-mentioned spur gears, and a stub shaft extending from said knife and journaled in said hollow shaft.

In testimony whereof I have signed my name to this specification on this 27th day of March, A. D. 1928.

JETZE van HOORN.